United States Patent
Yamada et al.

(10) Patent No.: US 8,340,472 B2
(45) Date of Patent: Dec. 25, 2012

(54) PIXEL INTERPOLATION APPARATUS AND METHOD

(75) Inventors: Kohji Yamada, Kawasaki (JP); Takashi Hamano, Kawasaki (JP); Mari Iwasaki, Fukuoka (JP)

(73) Assignee: Fujitsu Limited, Kawasaki (JP)

( * ) Notice: Subject to any disclaimer, the term of this patent is extended or adjusted under 35 U.S.C. 154(b) by 824 days.

(21) Appl. No.: 12/239,105

(22) Filed: Sep. 26, 2008

(65) Prior Publication Data

US 2009/0214132 A1 Aug. 27, 2009

(30) Foreign Application Priority Data

Feb. 26, 2008 (JP) ................. 2008-044754

(51) Int. Cl.
*G06K 9/54* (2006.01)

(52) U.S. Cl. ........ 382/300; 382/266; 382/165; 382/167; 382/189; 382/260; 382/265; 348/448; 348/700; 348/458; 348/701

(58) Field of Classification Search .................. 382/300, 382/266, 165, 167, 189, 260, 265; 348/448, 348/700, 458, 701
See application file for complete search history.

(56) References Cited

U.S. PATENT DOCUMENTS

| | | |
|---|---|---|
| 2003/0038817 A1 | 2/2003 | Kawamura et al. |
| 2004/0160439 A1 | 8/2004 | Xavier |
| 2005/0008251 A1* | 1/2005 | Chiang ......................... 382/266 |
| 2009/0102966 A1* | 4/2009 | Jiang et al. .................... 348/448 |

FOREIGN PATENT DOCUMENTS

| | | |
|---|---|---|
| JP | 2001-69469 | 3/2001 |
| JP | 2002-185934 | 6/2002 |
| JP | 2004-153668 | 5/2004 |
| JP | 2005-266918 | 9/2005 |
| JP | 2005-341337 | 12/2005 |
| JP | 2005-341346 | 12/2005 |
| JP | 2007-67652 | 3/2007 |
| WO | 00/75865 A1 | 12/2000 |

OTHER PUBLICATIONS

Japanese Office Action mailed Nov. 1, 2011 issued in corresponding Japanese Patent Application No. 2008-044754.

* cited by examiner

*Primary Examiner* — Mike Rahmjoo
(74) *Attorney, Agent, or Firm* — Staas & Halsey LLP

(57) ABSTRACT

In a pixel interpolation apparatus for interpolating pixels, an edge pixel detection unit detects edge pixels constituting an edge among pixels on lines positioned above/below the interpolation pixel. A continuous edge detection unit detects edge pixels in which two pixels or more consecutively line up among edge pixels detected by the edge pixel detection unit as a continuous edge. A continuous edge pair detection unit determines the combination of the continuous edges detected on each of the lines above and below the interpolation pixel among the continuous edges detected by the continuous edge detection unit. An edge direction determination unit determines the edge direction of the interpolation pixel on the basis of the positional relation of one set of continuous edges determined by the continuous edge pair detection unit. An interpolation pixel calculation unit calculates an interpolation pixel using the edge direction determined by the edge direction determination unit.

9 Claims, 23 Drawing Sheets

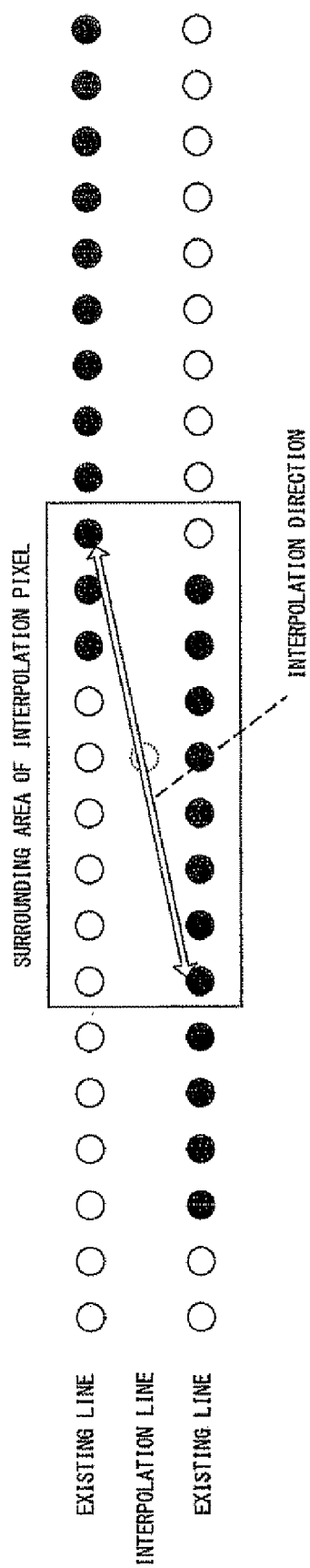
F I G. 1

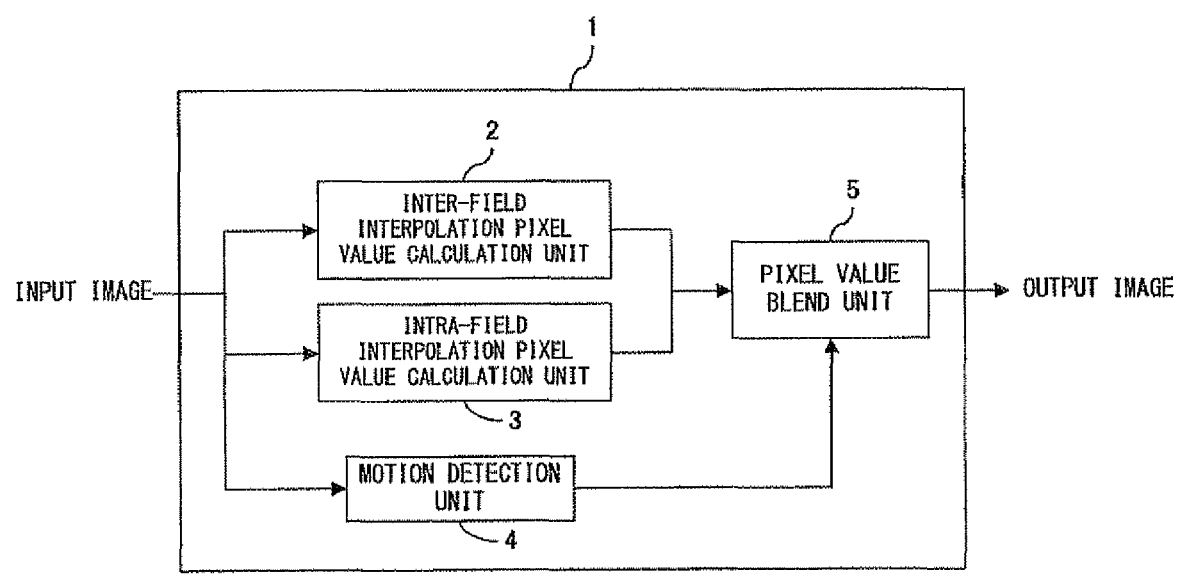
F I G. 2

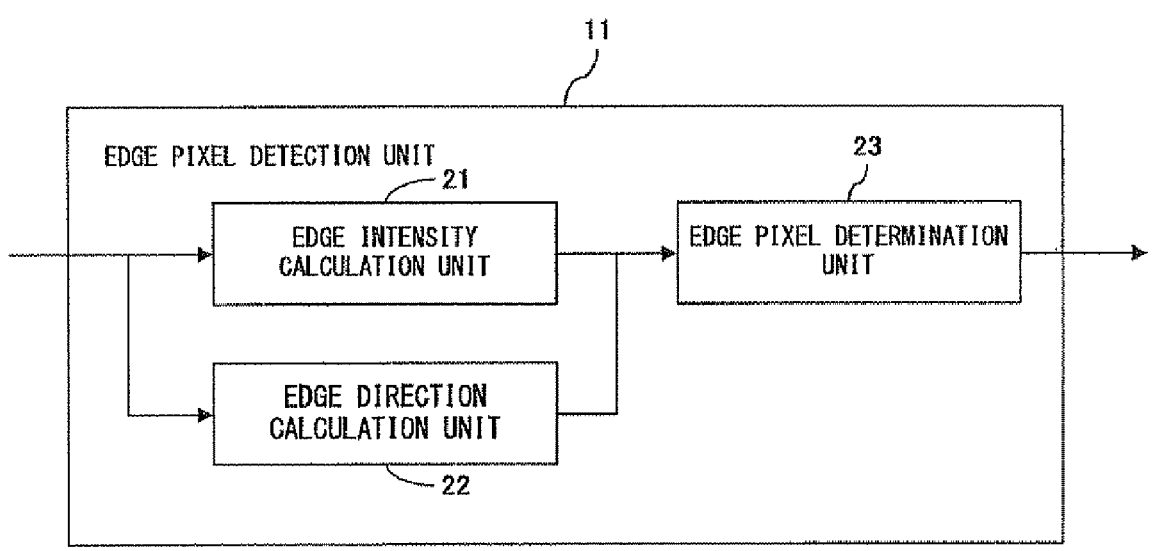
F I G. 4

| -1 | 0 | -1 |
|----|---|----|
| 0  | 4 | 0  |
| -1 | 0 | -1 |

FIG. 5

| 1/2 | 1 | 0 | -1 | -1/2 |
|---|---|---|---|---|
| 1/2 | 1 | 0 | -1 | -1/2 |
| 1/2 | 1 | 0 | -1 | -1/2 |

VERTICAL EDGE INTENSITY
CALCULATION FILTER

F I G. 6 A

| 1/2 | 1/2 | 1/2 |
|---|---|---|
| 1 | 1 | 1 |
| 0 | 0 | 0 |
| -1 | -1 | -1 |
| -1/2 | -1/2 | -1/2 |

HORIZONTAL EDGE INTENSITY
CALCULATION FILTER

F I G. 6 B

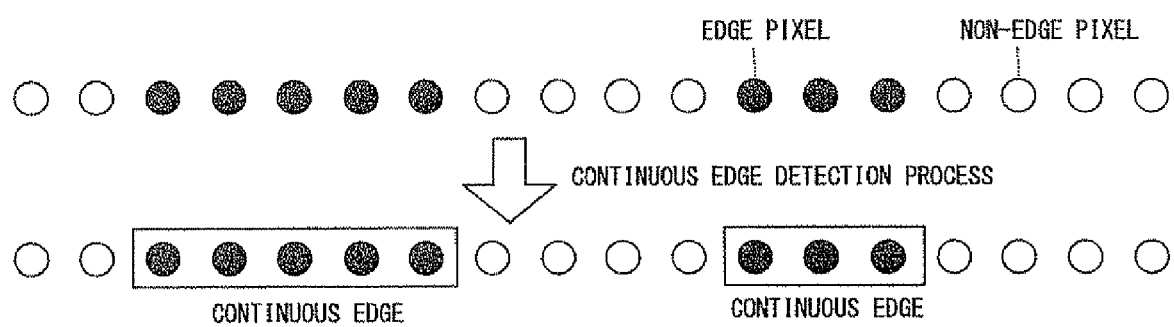
F I G. 7

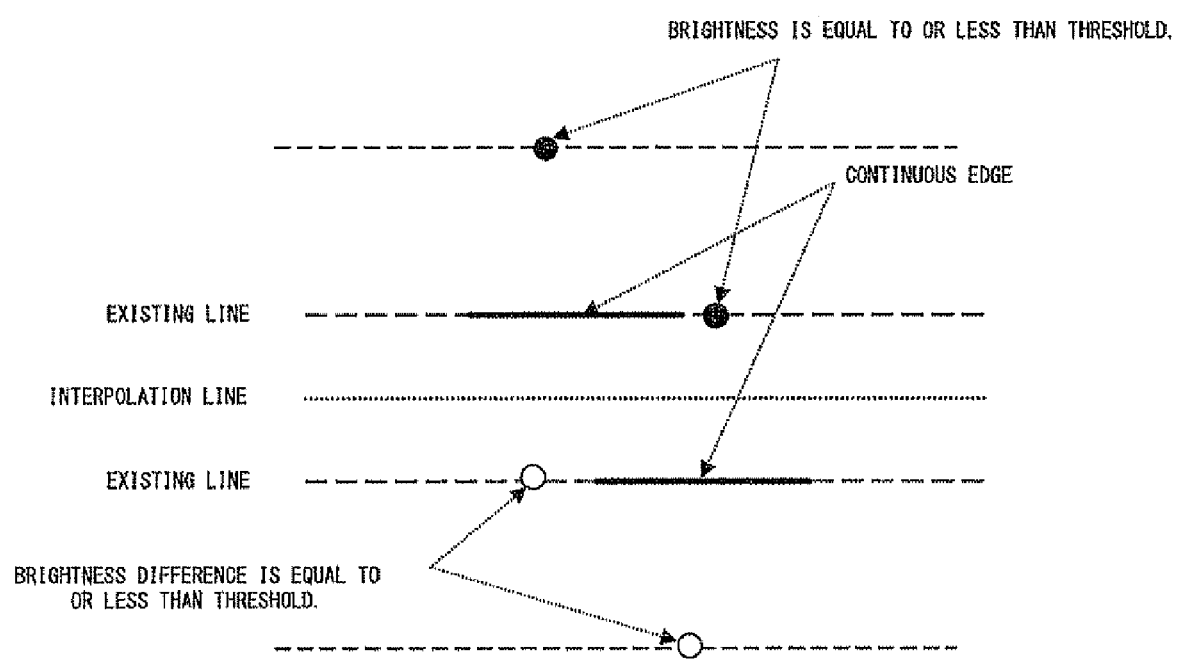
F I G. 9

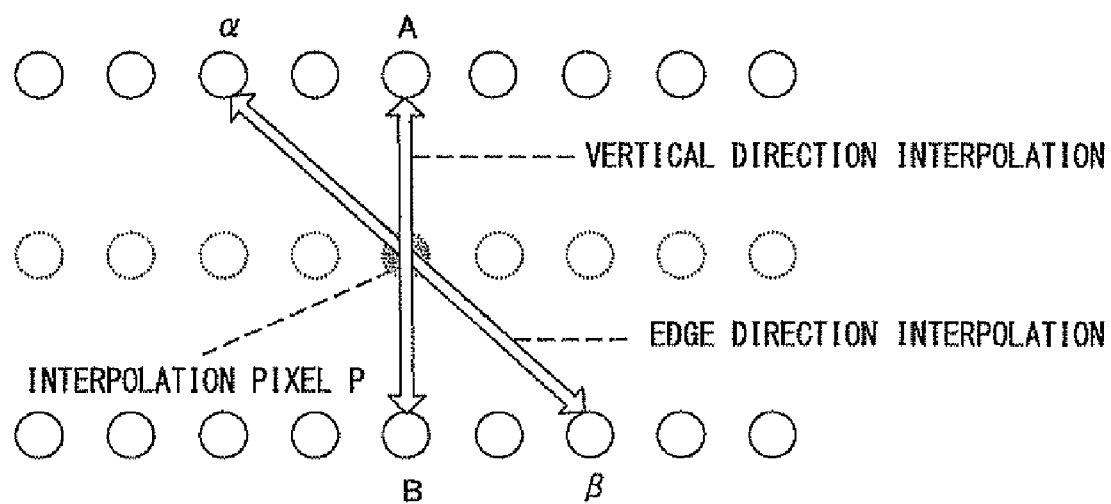
F I G. 23

PIXEL INTERPOLATION APPARATUS AND METHOD

BACKGROUND OF THE INVENTION

1. Field of the Invention

The present invention relates to a technique for interpolating pixels in a spatial direction by interlace progressive transform, image enlargement and the like.

2. Description of the Related Art

As examples of processes for interpolating pixels in the spatial direction, there are interlace progressive transform (progressive scan conversion), image enlargement and the like. Of these, in the interlace progressive transform, generally an interpolation pixel value is calculated by weighting and adding an intra-field interpolation pixel value obtained by intra-field interpolation and an inter-field interpolation pixel value obtained by inter-field interpolation according to the motion of a pixel. Alternatively, either the intra-field interpolation pixel value or the inter-field interpolation pixel value is selected.

Since the pixels of each field exist only on every another line, generally bi-linear or bi-cubic interpolation in the vertical direction is performed using pixels on lines above or below a target interpolation pixel in the calculation of an intra-field interpolation pixel value. If pixel interpolation in the vertical direction is performed by these interpolation methods out of relation to the edge direction, aliasing called jaggies occur in inclined edge parts.

As a technique for suppressing the occurrence of jaggies by pixel interpolation in inclined edge parts, for example, Japan Patent Publication No. 2005-341346 discloses a technique for determining which the surrounding area of an interpolation pixel is, a complex pattern, a flat pattern, a vertical-line pattern, an angular pattern or the like by detecting a direction to interpolate using the differential value of pixel information between adjacent pixels in the horizontal and vertical directions in a field, and discriminating an inclined direction edge and the like from the complex pattern and the like.

FIG. 1 shows the interpolation method of the Japan Patent Publication No. 2005-341346. Each point in FIG. 1 represents a pixel and of these, an edge pixel is represented by black color. If it is determined that it is the above patterns in the above determination, pixel interpolation is performed in the vertical direction. If it is determined that it is other than the above patterns, pixel differences for each direction in the surrounding area of the interpolation pixel shown In FIG. 1 is calculated and pixel interpolation is performed determining a highly correlative direction as an interpolation direction, thereby to reduce jaggies.

As another technique for reducing jaggies, for example, Japan Patent Publication No. 2005-266918 discloses a technique for determining whether there is an inclined direction edge about a focused pixel and detecting the edge directions of a plurality of pixel positions corresponding to the focused pixel position including the focused pixel on the basis of the determination result.

Japan Patent Publication No. 2005-341337 discloses a technique for calculating the sum of the pixel information about an area around a focused pixel which is an interpolation target and its surrounding pixel areas respectively, detecting the highest correlative direction on the basis of the pixel information of each of the calculated areas and the positional relation between the areas and determining it as an interpolation direction.

Furthermore, as another technique, Japan Patent Publication No. 2007-67652 discloses a technique for determining an inclined direction of an edge in a position of a focused pixel, further determining a shape of the edge in the position of the focused pixel and executing appropriate interpolation of the edge in the inclined direction according to the result of the determination of the shape of the edge.

Furthermore, as another technique, Japan Patent Publication No. 2000-075865 discloses a technique for detecting an edge included in an image and calculating its direction, generating an adaptive sampling function by transforming a two-dimensional sampling function adapting it to the calculated edge direction and interpolating the edge part using the adaptive sampling function.

According to the technique disclosed by the Japan Patent Publication No. 2005-341346, the limit of a gently inclined interpolation direction is restricted by the width of a surrounding pixel area for determining the interpolation direction. Specifically, if the width of the surrounding pixel area is small, the gently inclined interpolation direction cannot be detected.

Conversely, if the width of a surrounding pixel area is large, even the gently inclined interpolation direction can be detected. However, if the width of a surrounding pixel area is large, it is often determined that the surrounding area is a complex area (pattern, etc.). Therefore, an edge direction for reducing jaggies is seldom interpolated, which is a problem.

SUMMARY OF THE INVENTION

It is an object of the disclosed pixel interpolation apparatus and method to provide a technique for interpolating pixels in a correct edge direction including a gently inclined edge direction in view of the above problem.

In order to solve the problem, the disclosed pixel interpolation apparatus comprises an edge pixel detection unit for detecting edge pixels forming an edge, from pixels on lines positioned above/below or to the left/right of an interpolation pixel, a continuous edge detection unit for detecting edge pixels in which two pixels or more consecutively line up among the edge pixels detected by the edge pixel detection unit as a continuous edge, a continuous edge pair detection unit for combining continuous edges detected from lines above and below the interpolation pixel or continuous edges detected from lines to the left and right of the interpolation pixel among the continuous edges detected by the continuous edge detection unit, an edge direction determination unit for determining the edge direction of the interpolation pixel on the basis of the positional relation between one set of continuous edges determined by the continuous edge pair detection unit and an interpolation pixel calculation unit for calculating an interpolation pixel using the edge direction determined by the edge direction determination unit.

When pixels detected as edges from pixels on lines above/below or to the left/right of the interpolation pixel consecutively line up, the continuous pixels are detected as a continuous edge. When the continuous edge is on lines above/below or to the left/right of the interpolation pixel consecutively line up, two continuous edges are combined are specified as one set of continuous edges (continuous edge pair). Then, an edge direction is determined using the continuous edge pair. Since an interpolation pixel is calculated using an edge direction determined thus, a correct edge direction can be calculated and correct pixel interpolation can be performed even when the inclination of the edge is gentle.

The edge direction determination unit can also determine a direction obtained by connecting the middle point of each of the one set of continuous edges as the edge direction of the interpolation pixel. Alternatively, the edge direction determination unit can determine a direction obtained by connecting the left or right end pixels of the one set of continuous edges as the edge direction of the interpolation pixel.

The edge direction determination unit can also specify the edge direction at the middle point of one continuous edge of the one set of continuous edges as its initial value by the above edge direction determination method and consecutively determines an edge direction for each interpolation pixel using the pixel correlation between the surrounding pixels of the initial value of the edge direction of the interpolation pixel from the middle point toward the outside of the continuous edge.

Alternatively, the edge direction determination unit can specify the edge direction at the end point of one continuous edge of the one set of continuous edges as its initial value by the above edge direction determination method and consecutively determines an edge direction for each interpolation pixel using the pixel correlation between the surrounding pixels of the initial value of the edge direction of the interpolation pixel from the end point towards another end point.

Furthermore, the edge direction determination unit can determines the specified edge direction as the basic edge direction of the one set of continuous edge pixels and consecutively determines a final edge direction for each interpolation pixel on the basis of the basic edge direction and the pixel correlation between the surrounding pixels of the basic edge direction of the interpolation pixel.

According to the disclosed pixel interpolation device, one set of continuous edges can be detected from pixels adjacent the interpolation pixel, an edge direction can be calculated on the basis of the detected one set of continuous edges and an interpolation pixel can be calculated. By calculating an edge direction from the combination of actually detected continuous edges without limiting a range for determining an edge direction, even the edge direction of a gently inclined edge can be correctly determined, thereby correctly performing the pixel interpolation of an edge direction.

BRIEF DESCRIPTION OF THE DRAWINGS

FIG. 1 shows the conventional pixel interpolation method;
FIG. 2 shows the configuration of an interlace progressive transform device;
FIG. 4 shows the configuration of the edge pixel detection unit;
FIG. 5 shows an example of an edge strength calculation filter;
FIG. 6A shows another example of an edge strength calculation filter;
FIG. 6B shows another example of an edge strength calculation filter;
FIG. 7 shows the continuous edge detection method;
FIG. 9 also shows the detection method of a continuous edge pair (no. 2)

FIG. 23 shows another calculation method of an interpolation pixel value.

DESCRIPTION OF THE PREFERRED EMBODIMENTS

Figure 3:
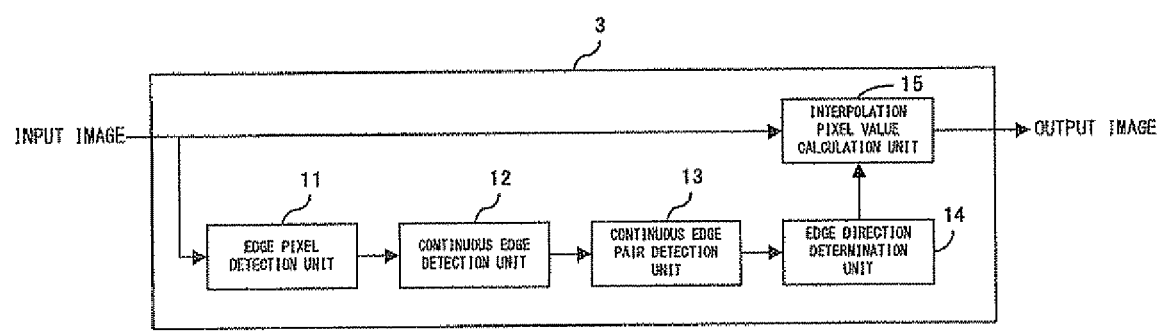
FIG. 3 shows the configuration of the pixel interpolation device.

The preferred embodiments of the present invention are described in detail below with reference to the drawings.

FIG. 2 shows the configuration of an interlace-progressive transform device. The interlace-progressive transform device 1 comprises an inter-field interpolation pixel value calculation unit 2, an intra-field interpolation pixel value calculation unit 3, a motion detection unit 4 and a pixel value blend unit 5.

Although a pixel interpolation method according to this preferred embodiment can also be applied to image enlargement, in the following description, pixel interpolation in interlace progressive transform is described as an example.

The inter-field interpolation pixel value calculation unit 2 detects the motion between two images in the field of the same parity, of inputted image signals, and calculates the interpolation pixel value of a field image of a different parity (this is called interpolation-target field image) between the two fields where the motion is detected, using the pixel of a field image at a time different from that of the interpolation-target field image. The intra-field interpolation pixel value calculation unit 3 applies bi-linear or bi-cubic interpolation and the like to the interpolation-target field image using pixels in the field.

The motion detection unit 4 calculates motion vectors from two images in the field of the same parity and detects their motion. The pixel value blend unit 5 weights the inter-field interpolation pixel value and the intra-field interpolation pixel value using the result of the motion detected by the motion detection unit 4, and generates and outputs an output image.

A pixel interpolation method according to this preferred embodiment is implemented in the intra-field interpolation pixel value calculation unit 3 of the interlace-progressive transform device 1 shown in FIG. 2. The intra-field interpolation pixel value calculation unit, that is, pixel interpolation device 3 is described below.

FIG. 3 shows the configuration of the pixel interpolation device (intra-field interpolation pixel value calculation unit) 3. The pixel interpolation device 3 shown in FIG. 3 comprises an edge pixel detection unit 11, a continuous edge detection unit 12, a continuous edge pair detection unit 13, an edge direction determination unit 14 and an interpolation pixel value calculation unit 15.

The edge pixel detection unit 11 detects edge pixels from lines above/below the interpolation pixel. The continuous edge detection unit 12 detects the edge pixels that consecutively line up from the edge pixels detected by the edge pixel detection unit 11 as a continuous edge when some edge pixels line up in a certain line.

The continuous edge pair detection unit 13 detects continuous edges as one set of continuous edges when there are continuous edges on lines above/below the interpolation pixel among the edges detected by the continuous edge detection unit 12. Hereinafter, one set of continuous edges detected by the continuous edge pair detection unit 13 is defined as "continuous edge pair".

The edge direction determination unit 14 determines the interpolation direction of the continuous edge pair detected by the continuous edge pair detection unit 13. The interpolation pixel value calculation unit 15 calculates an interpolation pixel value using the interpolation direction determined by the edge direction determination unit 14.

As described above, the pixel interpolation device 3 shown in FIG. 3 detects one set of edge pixels positioned on lines above/below the interpolation pixel, of edge pixels that consecutively line up as a continuous edge pair and determines an interpolation direction on the basis of the continuous edge pair. Since an interpolation direction is determined using an actually detected continuous edge pair without limiting it to within the range of a prescribed area as in the prior art, the inclination of an edge is not limited and even a gently inclined edge direction can also be correctly detected.

In this preferred embodiment, since pixel interpolation in interlace-progressive transform is described, edge pixels and continuous edges are detected from lines above/below the interpolation pixel. For example, in a process, such as image enlargement and the like, edge pixels and continuous edges are detected from not only lines above/below the interpolation pixel but also lines to its left/right.

The configuration and its operation of each unit of the pixel interpolation device 3 shown in FIG. 3 are described in detail below.

FIG. 4 shows the configuration of the edge pixel detection unit 11. The edge pixel detection unit 11 shown in FIG. 4 comprises an edge intensity calculation unit 21, an edge direction calculation unit 22 and an edge pixel determination unit 23.

The edge intensity calculation unit 21 calculates edge intensity using an edge strength calculation filter.

Figure 5:
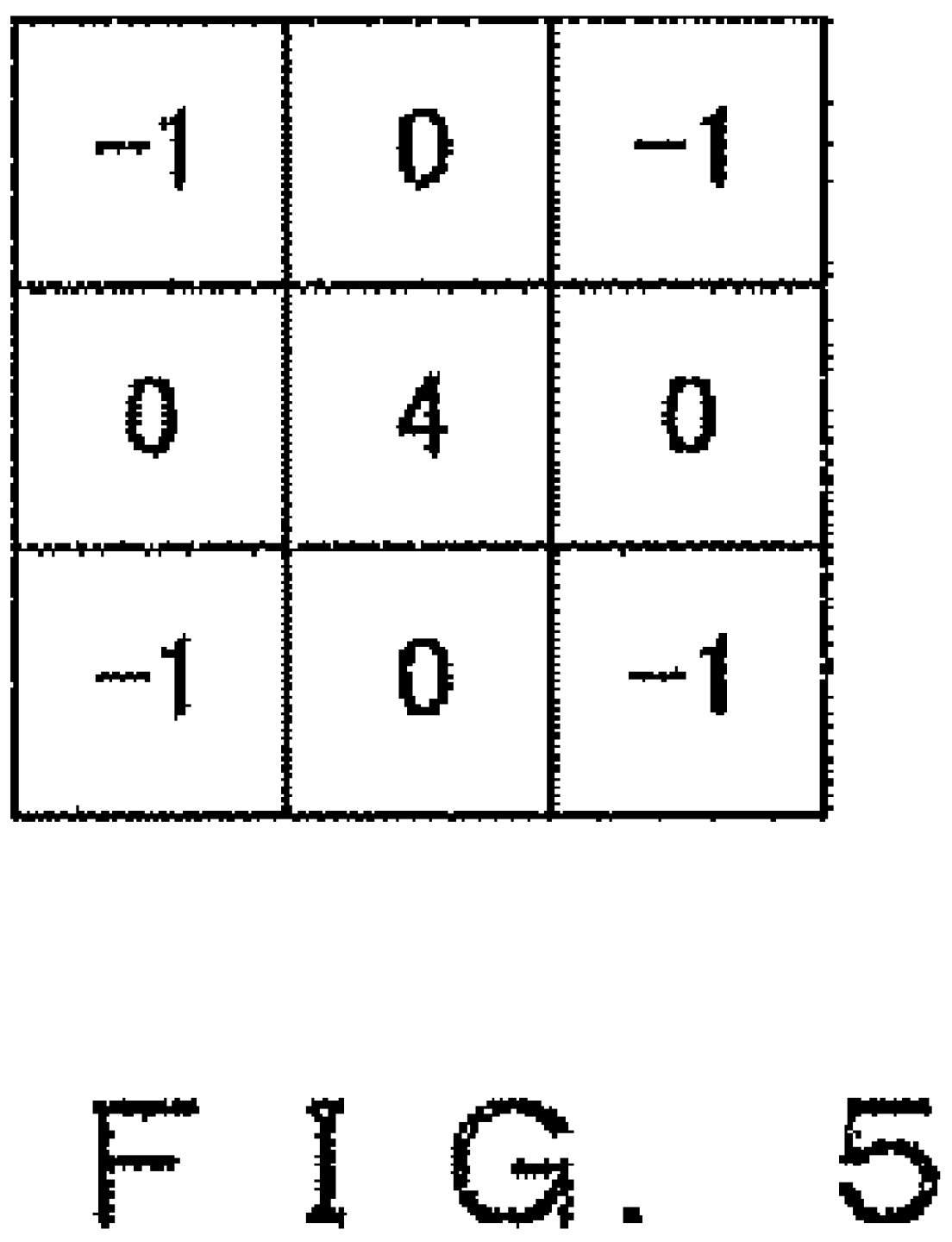

FIG. 5 shows an example of an edge intensity calculation filter. The edge intensity calculation filter calculates edge intensity by calculating a brightness correlation value between a focused pixel and its peripheral pixel. As the edge intensity calculation filter is a well-known technique, its detailed description is omitted here.

FIGS. 6A and 6B show other examples of the edge intensity calculation filter. FIG. 6A is an example of the edge intensity calculation filter for the vertical direction. FIG. 6B is an example of the edge intensity calculation filter for the horizontal direction. Edge intensity in both the vertical and horizontal directions can also be separately calculated using the filters shown in FIGS. 6A and 6B.

The edge direction calculation unit 22 calculates an edge angle (edge direction) from the ratio between edge intensity in the vertical and horizontal directions.

The edge pixel determination unit 23 determines an edge pixel using the edge intensity and direction calculated by the edge intensity calculation unit 21 and the edge direction calculation unit 22, respectively. More specifically, a pixel whose edge intensity is equal to or more than a predetermined threshold and whose edge direction is also equal to or less than a predetermined angle is detected as an edge pixel.

FIG. 7 shows the continuous edge detection method. Each point shown in FIG. 7 represents a pixel and of these points, a pixel detected as an edge pixel by the edge pixel detection unit 11 is represented by black color.

As shown in FIG. 7, when a plurality of edge pixels, consecutively lining up, of the detected edge pixels is represented by a certain line, those edge pixels are detected as a continuous edge. The fact that a predetermined number or more of edge pixels consecutively line up can also be made an additional condition.

Figure 8:
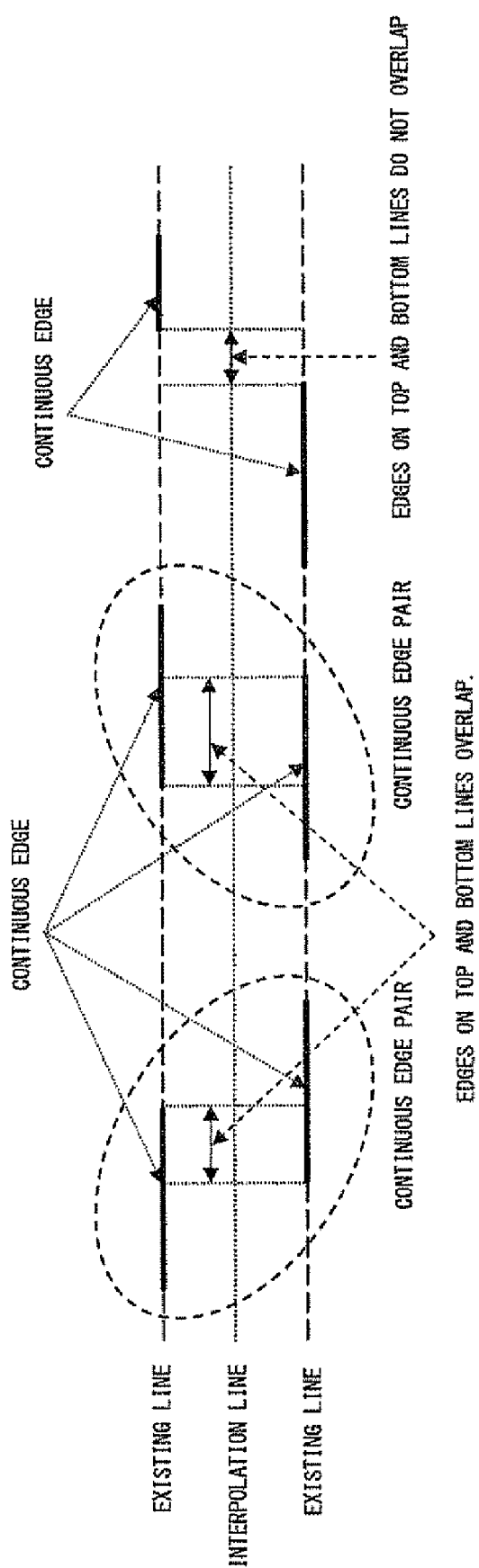
FIG. 8 shows the detection method of a continuous edge pair (No. 1)

FIG. 8 shows a detection method of a continuous edge pair. Of the existing lines shown in FIG. 8, a continuous edge is represented by a solid line. FIG. 8 shows a case where three continuous edges exist on the existing lines above/below the interpolation line.

In the preferred embodiment, when there is one pixel or more overlaps in the continuous edges on lines above/below the interpolation line the method for detecting a continuous edge pair from continuous edges detected from the existing lines positioned above/below the interpolation line detects the combination of the continuous edges as a continuous edge pair.

The fact that a ratio in length between the continuous edges is equal to or less than a predetermined threshold can also be an additional detection condition. Furthermore, the detection condition shown in FIG. 9 can also be added.

FIG. 9 shows another detection method of the continuous edge pair. When there is one set of continuous edges their parts of which overlap each other, a brightness difference between a pixel on the existing line including the continuous edges and a pixel on another existing line in the left/right areas divided by the one set of continuous edges is calculated. The fact the calculated brightness difference is equal to or less than a predetermined threshold in each of the left/right areas can be made an additional detection condition. This additional detection condition is based on the assumption that the brightness values are within a certain range in the left or right side area of the edge.

Figure 10:
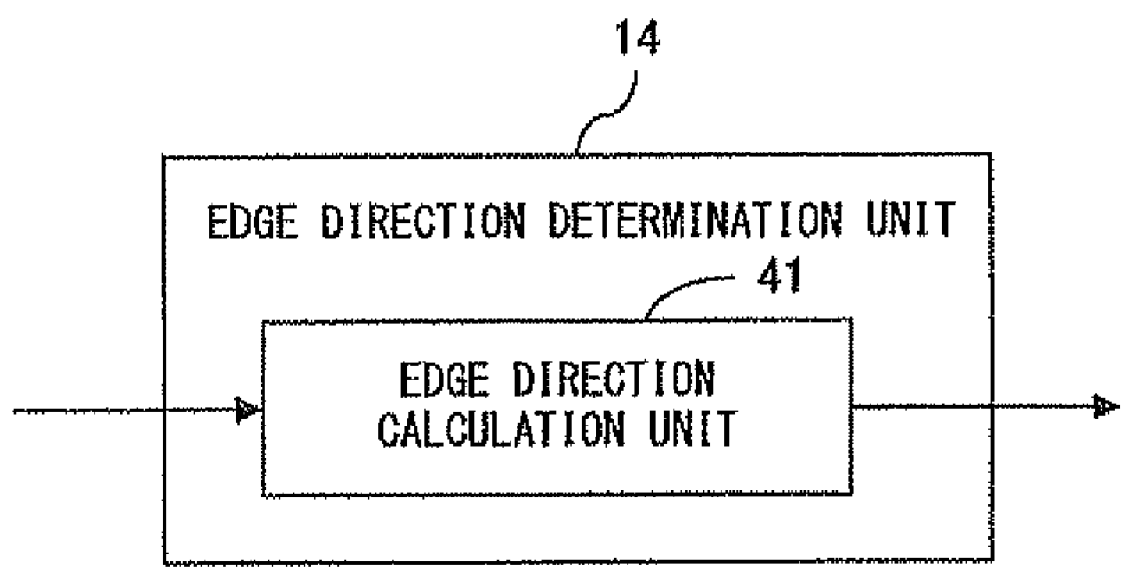
FIG. 10 shows the configuration of the edge direction determination unit.

FIG. 10 shows a configuration of the edge direction determination unit 14. The edge direction determination unit 14 shown in FIG. 10 comprises an edge direction calculation unit 41.

The edge direction calculation unit 41 determines the edge direction and pixel interpolation area of the interpolation pixel on the basis of the positional relation between continuous edges forming the continuous edge pair detected by the continuous edge pair detection unit 13. More specifically, the edge direction and pixel interpolation area for each interpolation pixel are calculated on the basis of the positional information of the inputted continuous edge pair and the brightness values of the continuous edge pair and its peripheral pixels.

The positional information of the continuous edge pair comprises information indicating the position of the starting pixel of each continuous edge and information indicating the position of its ending pixel.

Figure 11A:
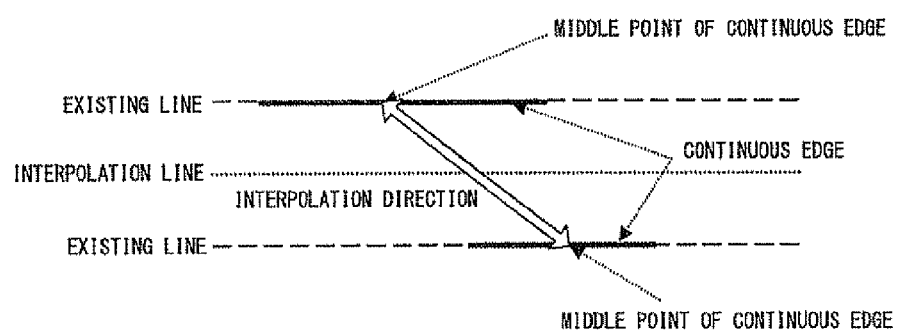
FIG. 11A shows a method for determining an interpolation direction using a continuous edge pair (No. 1)
Figure 11B:
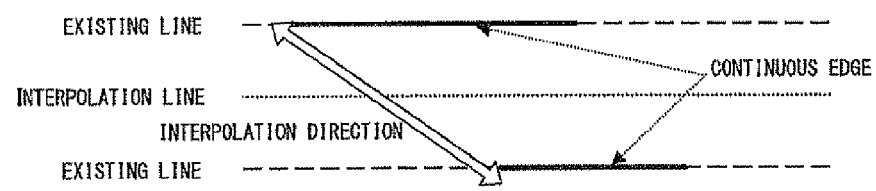
FIG. 11B shows a method for determining an interpolation direction using a continuous edge pair (No. 2)
Figure 11C:
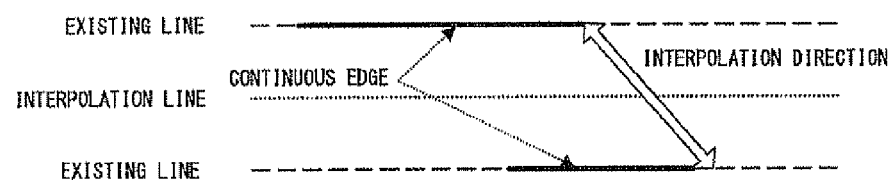
FIG. 11C shows a method for determining an interpolation direction using a continuous edge pair (No. 3)

FIGS. 11A, 11B and 11C show the method for determining an interpolation direction using a continuous edge pair. As shown in FIG. 11A, for example, a direction obtained by connecting the middle point of each continuous edges of the continuous edge pair can be made an edge direction. Alternatively, as shown in FIGS. 11B and 11C, a direction obtained by connecting the left or right ends of each continuous edges of the continuous edge pair can be made an edge direction.

Figure 12:
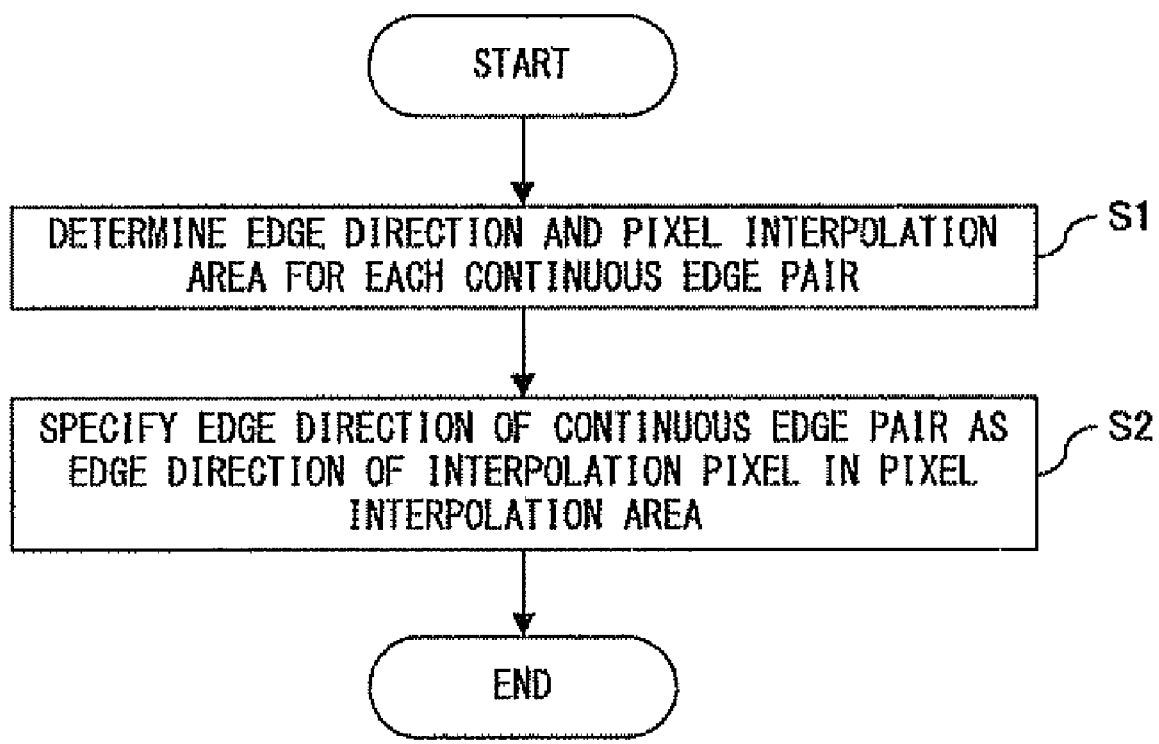
FIG. 12 is a flowchart showing a process for determining an edge direction.

FIG. 12 is a flowchart showing a process for determining an edge direction using the above method.

The process shown in FIG. 12 is started with the input to the edge direction determination unit 14 of the positional information of the continuous edge pair and the brightness values of the continuous edge pair and its peripheral pixel as a trigger.

Firstly, in step S1 an edge direction and a pixel interpolation area are determined for each continuous edge pair. As described above, the edge direction can be obtained by calculating the position of the middle point, left end or right end from the positional information of an inputted continuous edge pair. The pixel interpolation area can be obtained by calculating an area to interpolate on the basis of the brightness values of an inputted continuous edge pair and its peripheral pixel.

In step S2, the edge direction of the continuous edge pair is set as the edge direction of the interpolation pixel of the pixel interpolation area calculated in step S1 and the process is terminated.

Figure 13:
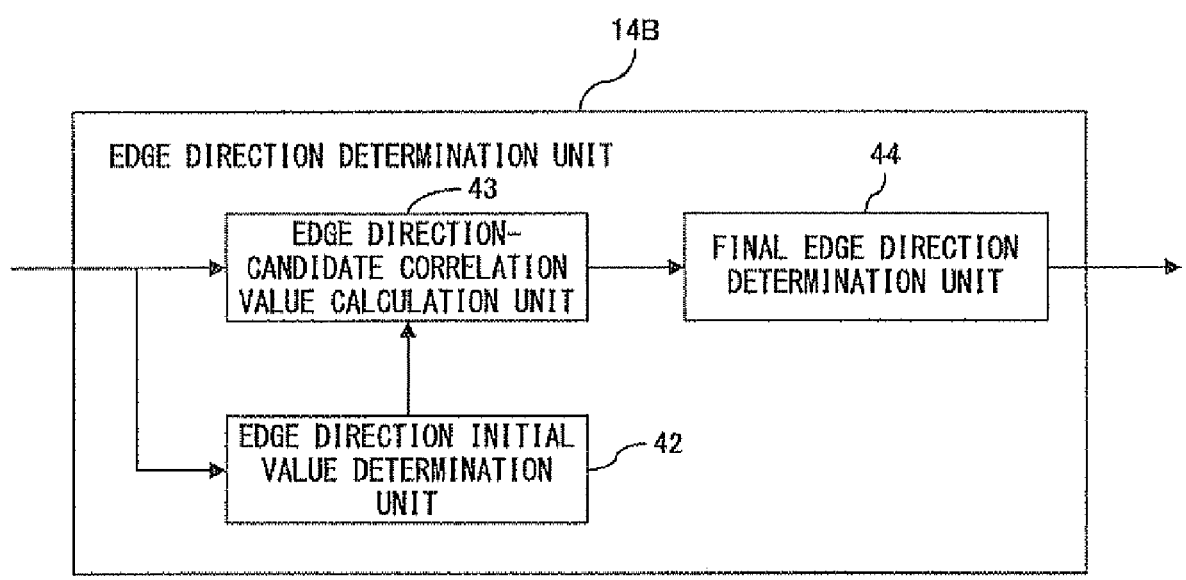
FIG. 13 shows another configuration of the edge direction determination unit.

FIG. 13 shows another configuration of the edge direction determination unit. The edge direction determination unit 14B shown in FIG. 13 comprises an edge direction initial value determination unit 42, an edge direction-candidate correlation value calculation unit 43 and a final edge direction determination unit 44. In the description of FIG. 13 and after, a reference numeral "14B" is attached to this edge direction determination unit in order to discriminate it from the edge direction determination unit 14 shown in FIG. 10.

The edge direction determination unit 14B shown in FIG. 13 differs from the edge direction determination unit 14 shown in FIG. 10 in determining the edge direction calculated by the same method as described above as the initial value of the edge direction and determining a final edge direction on the basis of the calculated edge direction initial value and the correlation between the interpolation pixel and its peripheral pixel.

The edge direction initial value determination unit 42 calculates an edge direction by the same method as in the edge direction calculation unit 41 shown in FIG. 10 and specifies it as the initial value of the edge direction. The edge direction initial value determination unit 42 outputted the brightness values of the continuous edge pair and its peripheral pixel in addition to the edge direction and pixel interpolation area of each continuous edge pair.

The edge direction-candidate correlation value calculation unit 43 calculates the pixel correlation value of the edge direction candidate of the peripheral pixel of the interpolation pixel using the information inputted from the edge direction initial value determination unit 42, that is, the edge direction of each continuous edge pair, the pixel interpolation area and the brightness values of the continuous edge pair and its peripheral pixel. Then, the edge direction-candidate correlation value calculation unit 43 outputs the pixel correlation value and pixel interpolation area of each interpolation pixel. The detailed calculation method of the pixel correlation value will be described later.

The final edge direction determination unit 44 determines a final edge direction for each interpolation pixel on the basis of the information inputted from the edge direction-candidate correlation value calculation unit 43, that is, the pixel correlation value and pixel interpolation area of the edge direction candidate of each interpolation pixel and outputs the edge direction and pixel interpolation area for each pixel.

Figure 14:
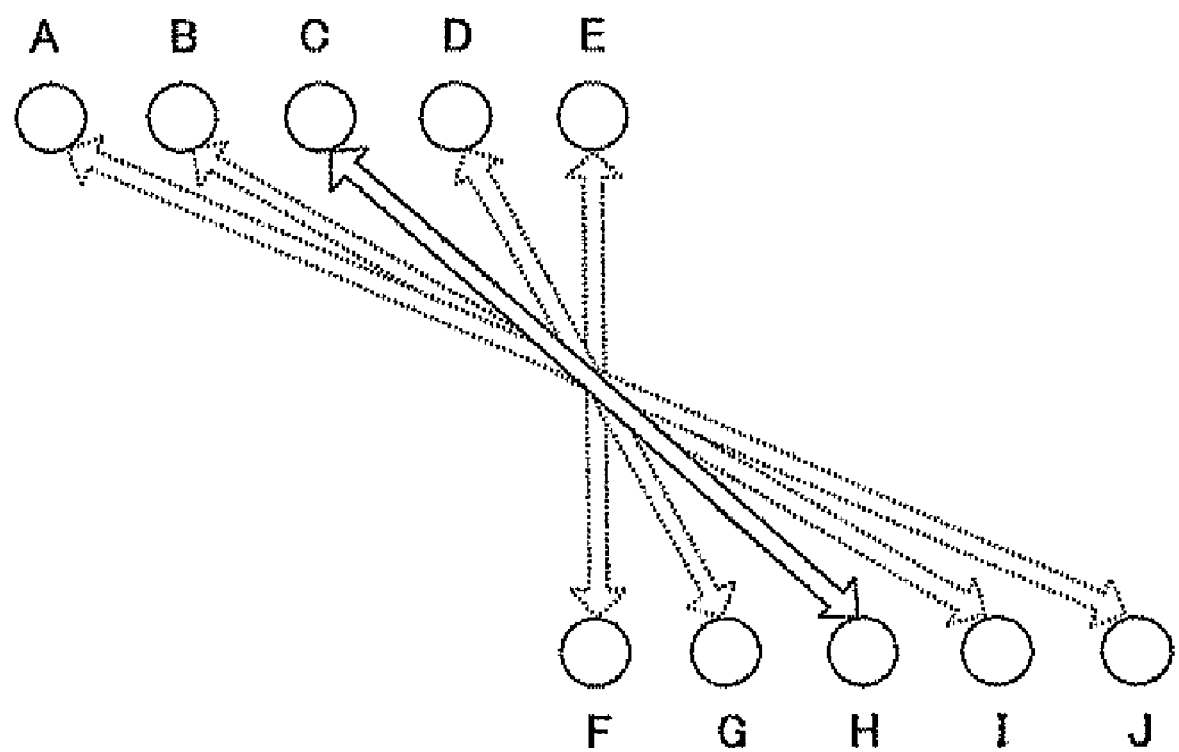
FIG. 14 shows the calculation method of an edge direction-candidate correlation value.

FIG. 14 shows the calculation method of an edge direction-candidate correlation value. Of the pixels shown in FIG. 14, pixels A to E and pixels F to J represent pixels on the existing lines positioned above/below the interpolation line, respectively. A case where the initial value of an edge direction is pixels C-H is described below.

The two pixels to the left/right of each pixel of the initial values C-H of the edge direction are extracted and their correlation values are calculated. Specifically, |C-H|, |A-J|, |B-I|, |D-G| and |E-F| are calculated. For the detailed calculation method of the correlation value, a well-known technique is used.

For the calculation method of the correlation value other than the above-described, for example, pixels other than the pixels in the edge direction (pixels C and H in FIG. 14) can also be used. For example, the average of a predetermined number of pixels in the horizontal direction (for example, five pixels) using the pixel in the edge direction as the center can also be used.

Figure 15:
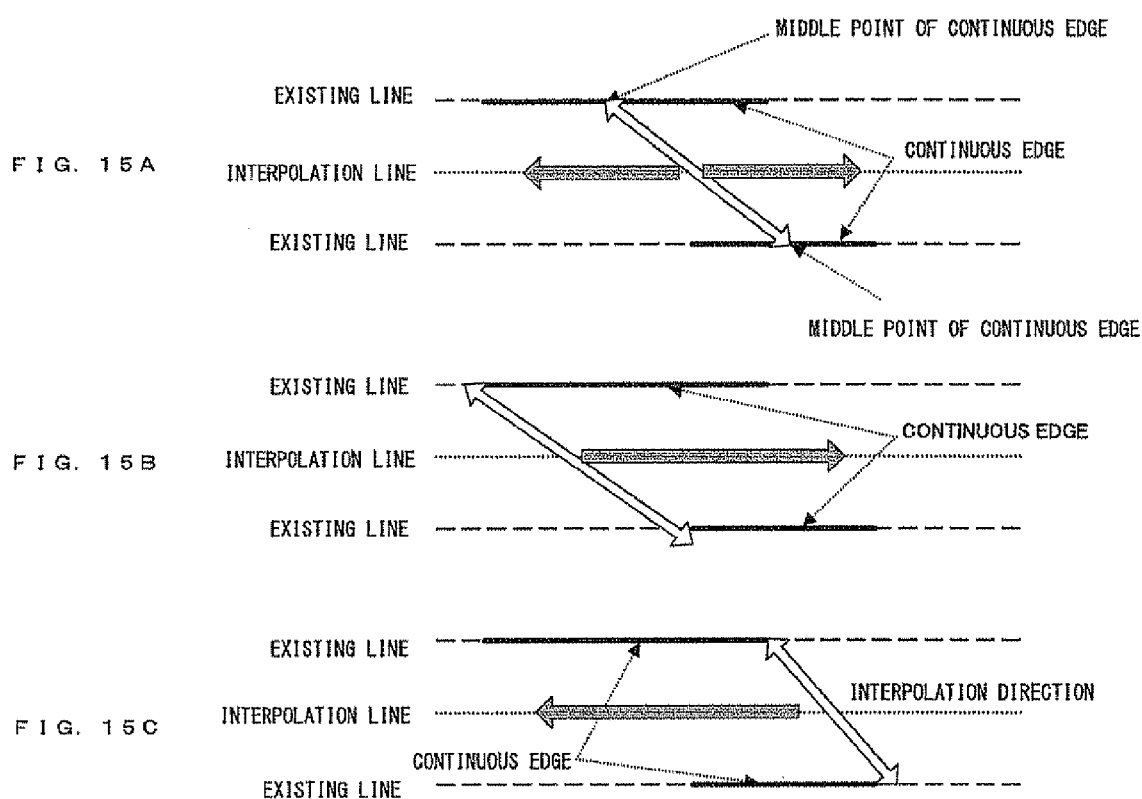
FIG. 15A shows the determination method of an edge interpolation direction (No. 1)
FIG. 15B shows the determination method of an edge interpolation direction (No. 2)
FIG. 15C shows the determination method of an edge interpolation direction (No. 3)

FIGS. 15A, 15B and 15C show the determination method of an edge interpolation direction.

As shown in FIG. 15A, the initial value of the edge direction can also be calculated using a pixel positioned at the middle point of each continuous edge and an edge interpolation direction can also be consecutively calculated from the middle point of each continuous edges forming the continuous edge pair toward the outside.

Alternatively, as shown in FIGS. 15B and 15C, the initial value of the edge direction can be calculated using pixels positioned at the left/right ends of each continuous edge and an edge interpolation direction can be consecutively calculated toward the right and left sides, respectively.

When any of pixels above/below the interpolation pixel goes beyond the area of the continuous edge, interpolation can also be terminated. Or else interpolation can be executed outside the continuous edge. That is, interpolation can be terminated when both of pixels above/below the interpolation pixel goes beyond the area of the continuous edge.

Figure 16:
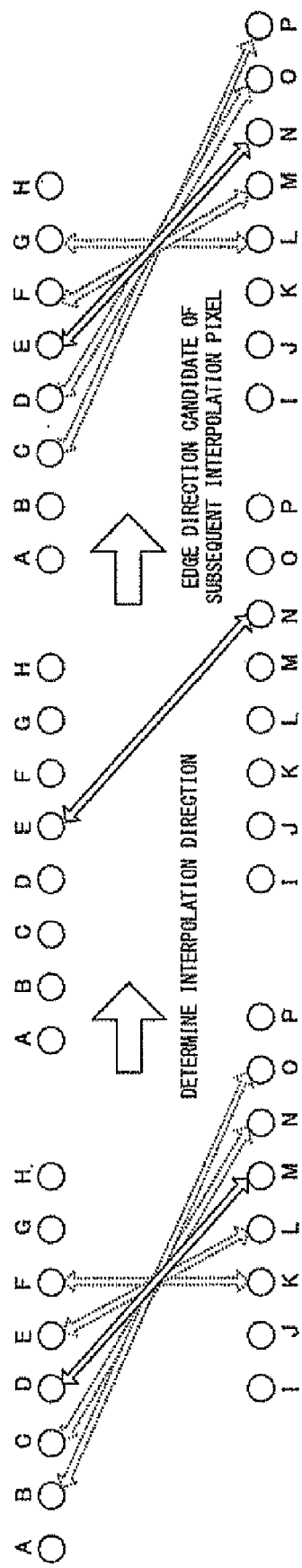
FIG. 16 shows a method for setting an interpolation direction candidate for each target interpolation pixel (No. 1)
Figure 17:
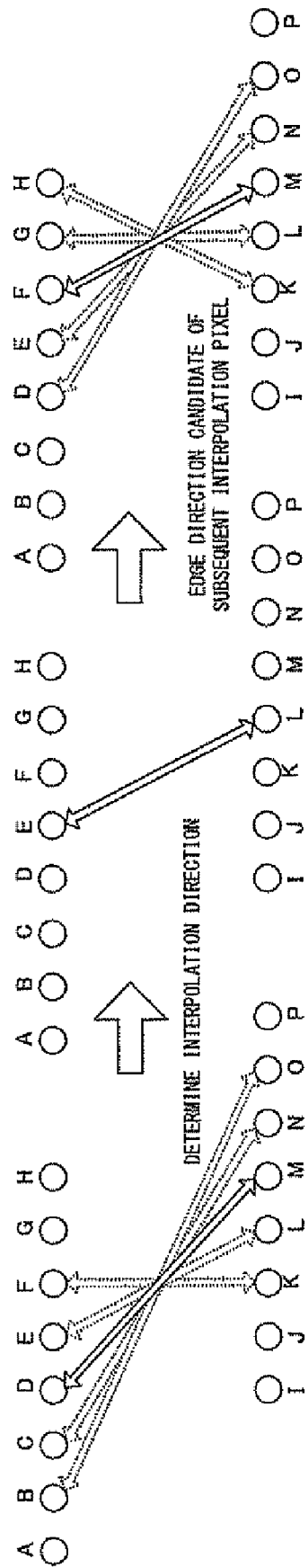
FIG. 17 shows a method for setting an interpolation direction candidate for each target interpolation pixel (No. 2)

FIGS. 16 and 17 show a method for setting an interpolation direction candidate for each target interpolation pixel.

For example, as shown in FIG. 16, when determining an interpolation direction using D-M as the initial values and then determining the interpolation direction of a target interpolation pixel positioned to the right by one pixel, the correlation value can also be calculated by the above method using E-N obtained by shifting each of the calculated initial values D-M to the right by one pixel as the center.

Alternatively, as shown in FIG. 17, when determining the E-L as the interpolation direction using D-M as the initial values and then determining the interpolation direction of a target interpolation pixel positioned to the right one pixel, an correlation value can be calculated by the above method, using a direction F-M obtained by connecting pixels F and M shifted each of the pixels E and L in the determined interpolation direction to the right by one pixel as the center.

Figure 18:
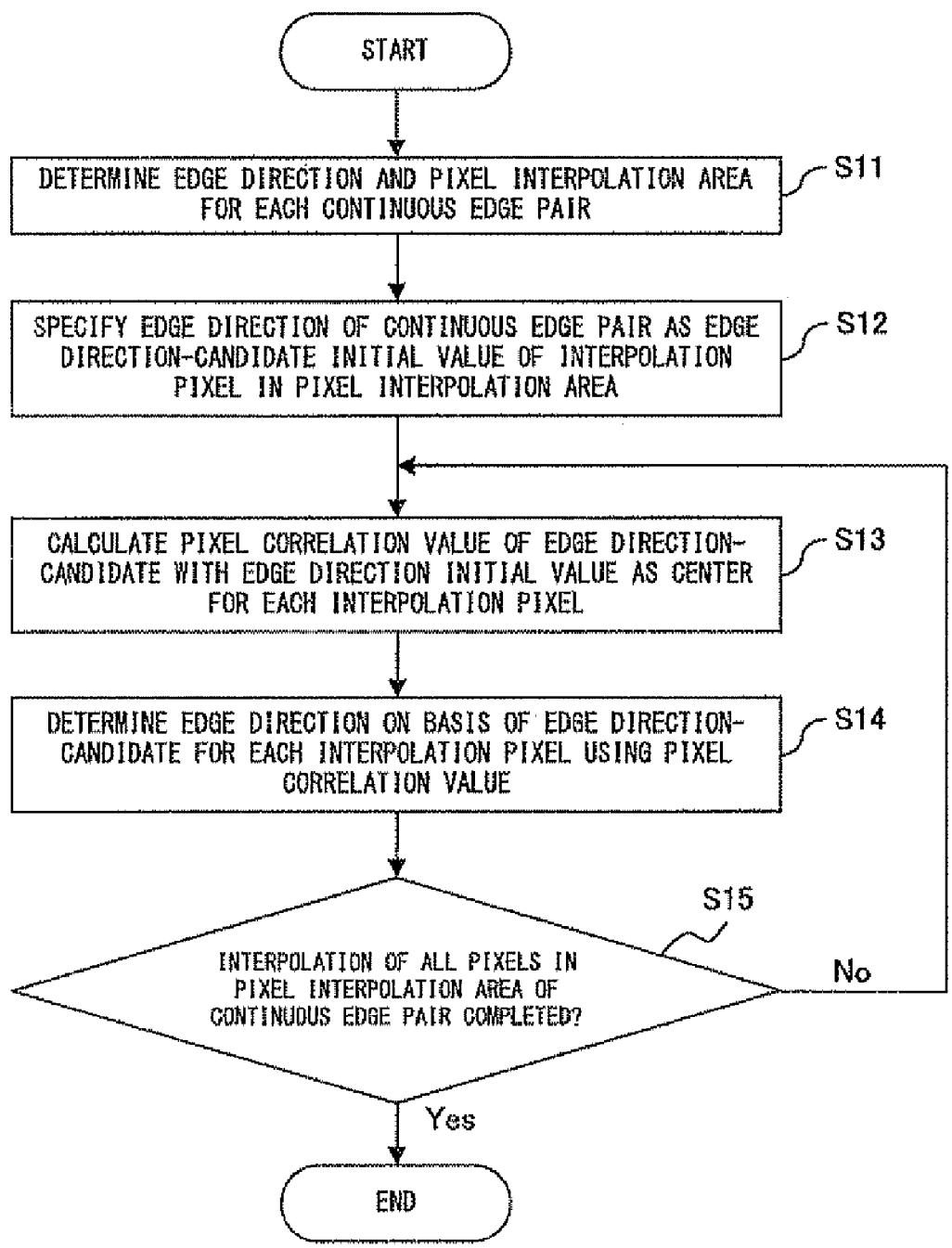
FIG. 18 is a flowchart showing a process for determining an edge direction for each interpolation pixel (No. 1)

FIG. 18 is a flowchart showing a process for setting an interpolation direction candidate by the method shown in FIG. 16 and determining an edge direction for each interpolation pixel. As described above, according to the method shown in FIG. 16, the correlation value of an interpolation direction candidate to subsequently determine can be calculated using a direction obtained by shifting pixels in the continuous edge to a prescribed direction (to the left or right) by one pixel in parallel with the interpolation direction specified as the initial value.

Like the process shown in FIG. 12, the process shown in FIG. 18 is started with the input to the edge direction determination unit 14B of the positional information of the continuous edge pair and the brightness values of the continuous edge pair and its peripheral pixel as a trigger. As described above, the positional information of the continuous edge pair comprises information indicating the position of the starting pixel of each continuous edge pair and information indicating the position of its ending pixel.

Firstly, in step S11, the same process as in step S1 of FIG. 12 is performed and an edge direction and a pixel interpolation area are determined for each continuous edge pair. In step S12 the determined edge direction of each continuous edge pair is set as the initial value of the edge direction candidate of an interpolation pixel in the pixel interpolation area.

In step S13, as to an interpolation target pixel, the pixel correlative value of the edge direction candidate is calculated using the edge direction initial value as the center and in step S14, as to the interpolation target pixel, an edge direction is determined of the edge direction candidates, using the pixel correlative value. Then, in step S15, it is determined whether the interpolation of all the pixels in the pixel interpolation area of the continuous edge pair is completed. Although all the pixels in each continuous edge pair forming the continuous edge pair are interpolated in FIG. 18, the interpolation is not limited to this. As described earlier, interpolation can also be carried out until up to the end of one continuous edge is completed.

If in step S15 it is determined that the interpolation of all the pixels in the pixel interpolation area of the continuous edge pair is not completed yet, the flow returns to step S13 and the same process is applied to pixels in one predetermined direction of the right or left side by one pixel.

After this, the processes in step S13 and S14 are repeatedly applied to each interpolation pixel and if it is determined that the interpolation of all the pixels in the pixel interpolation area of the continuous edge pair is completed in step S15, the process is terminated.

Figure 19:
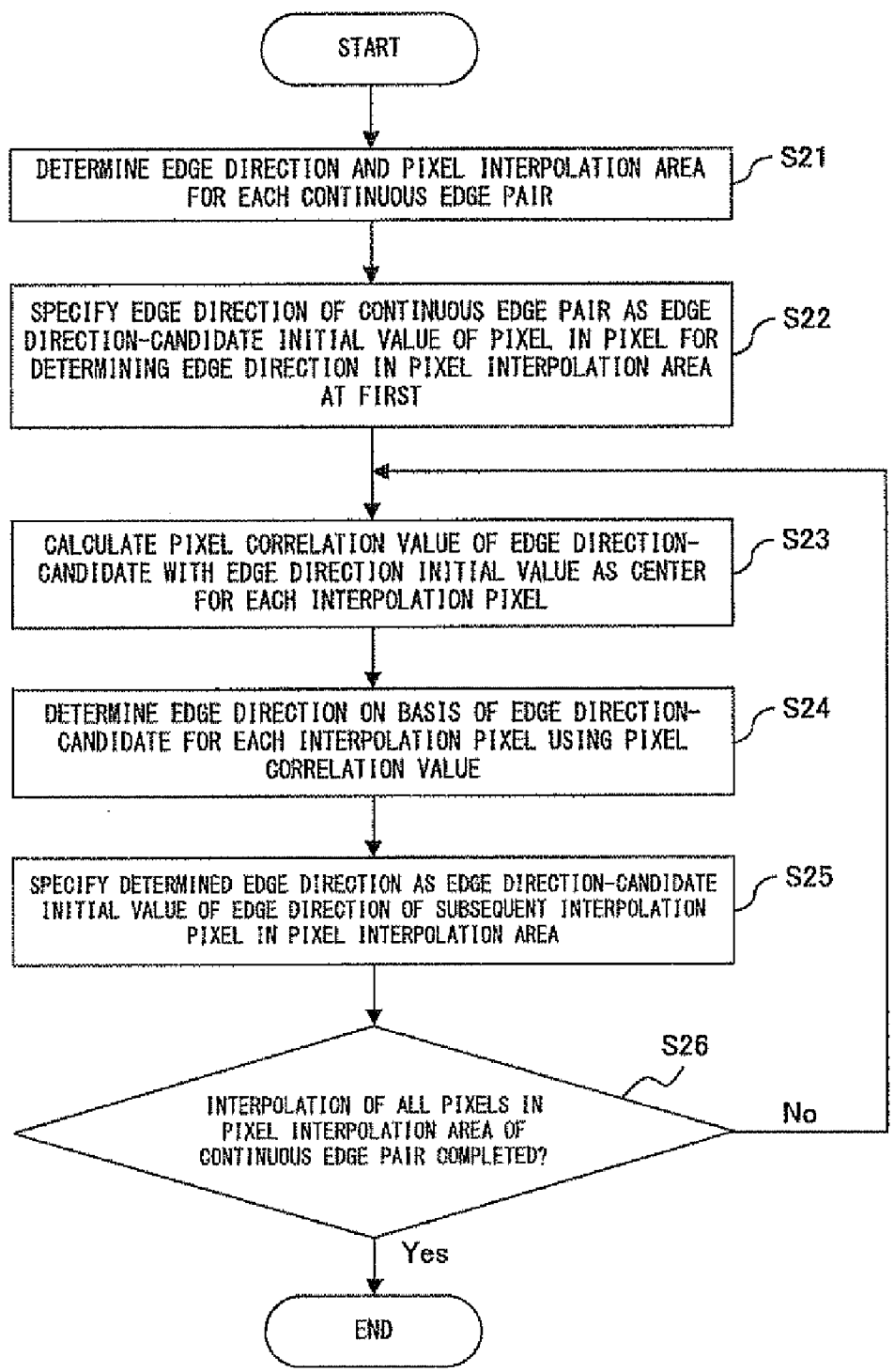
FIG. 19 is a flowchart showing a process for determining an edge direction for each interpolation pixel (No. 2)

FIG. 19 is a flowchart showing a process for setting interpolation direction candidates by the method shown in FIG. 17 and determining an edge direction for each interpolation pixel. As described above, according the method shown in FIG. 17, a correlative value is calculated around a direction obtained by shifting the interpolation direction determined of a specific interpolation target pixel to the predetermined direction (the right or left side) by one pixel in parallel.

The process shown in FIG. 19 is started using the input to the edge direction determination unit 14B, of the positional information of a continuous edge pair and the brightness values of the continuous edge pair and its peripheral pixel as a trigger, as in the processes shown in FIGS. 12 and 18. The positional information of a continuous edge pair is composed of information indicating the position of the start pixel in each continuous edge and information indicating the position of the end pixel.

Firstly, in step S21 the same process as in step S1 of FIG. 12 and step S11 of FIG. 18 is performed. In step S22 the edge direction of the continuous edge pair is set as the initial value of the edge direction candidate of an interpolation pixel for determining an edge direction in the pixel interpolation area first.

The processes in steps S23 and S24 correspond to those of steps S13 and S14, respectively, of FIG. 18.

In step S25 the edge direction determined in step S24 is set as the initial value of the edge direction candidate of a subsequent interpolation pixel. Then, in step S26, as in step S15 of FIG. 18, it is determined whether the interpolation of all pixels in the pixel interpolation area of the continuous edge pair. If the interpolation is not completed, the flow returns to step S23 and the same process is repeated. If it is determined that the interpolation of all the pixels is completed in step S26, the process is terminated.

Figure 20:
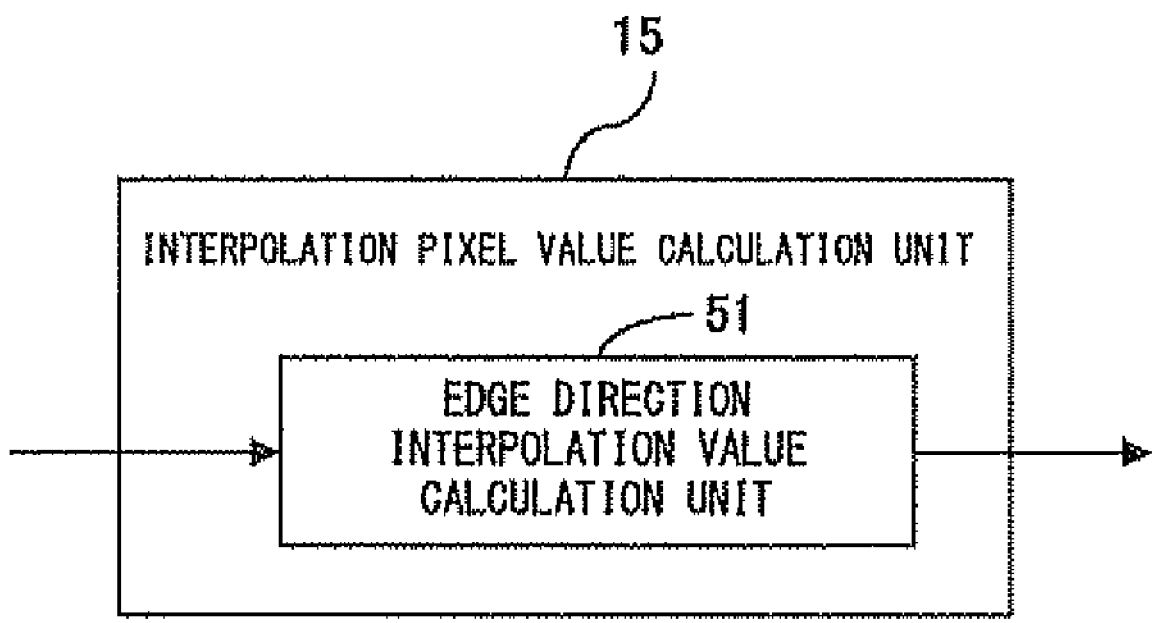
FIG. 20 shows one configuration of the interpolation pixel value calculation unit.

FIG. 20 shows a configuration of the interpolation pixel value calculation unit 15. The interpolation pixel value calculation unit 15 shown in FIG. 20 comprises an edge direction interpolation value calculation unit 51.

The edge direction interpolation value calculation unit 51 calculates an interpolation pixel value on the basis of an image inputted to the pixel interpolation device 3 and the edge direction for each pixel, determined by the edge direction determination unit 14 and outputs it.

Figure 21:
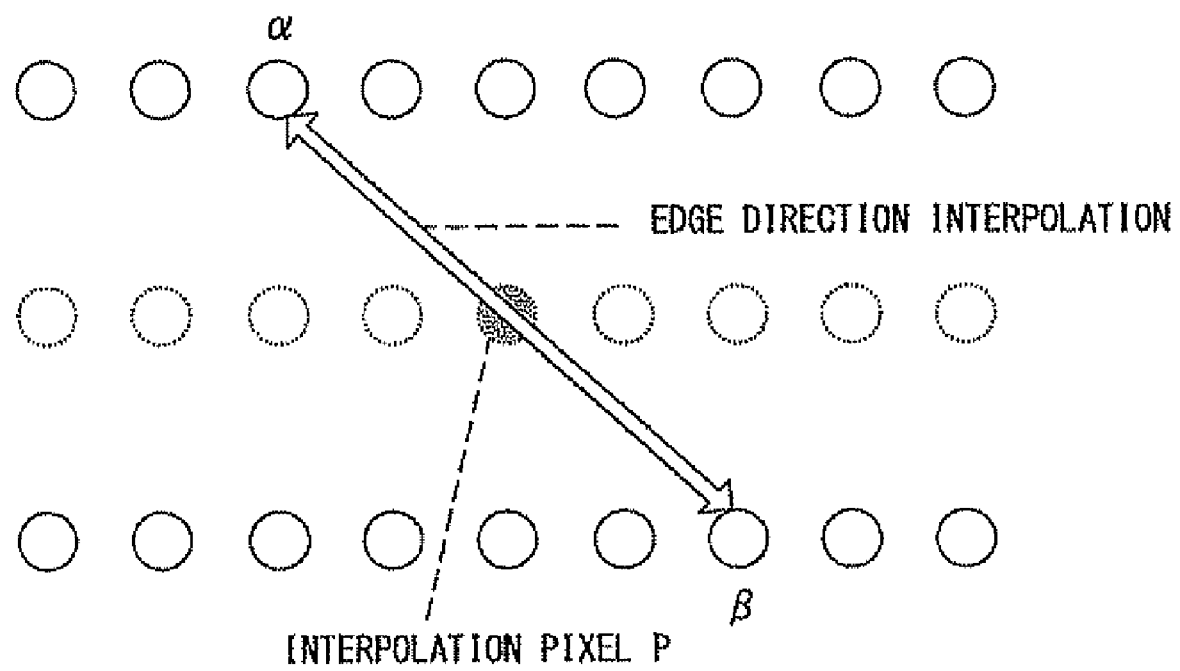
FIG. 21 shows the calculation method of an interpolation pixel value.

FIG. 21 shows one calculation method of an interpolation pixel value. In FIG. 21 pixels on three lines are represented by a circle. Of these, pixels on the top and bottom lines represent pixels on the existing line and pixels in the middle line represent pixels on the interpolation line.

The interpolation pixel value η of an interpolation pixel P is calculated as follows using the pixel values α and β of a pixel positioned in the edge direction of the interpolation pixel P of the pixel value calculation target of pixels on the actually existing top and bottom lines.

$$\eta = (\alpha + \beta)/2 \quad (1)$$

Figure 22:
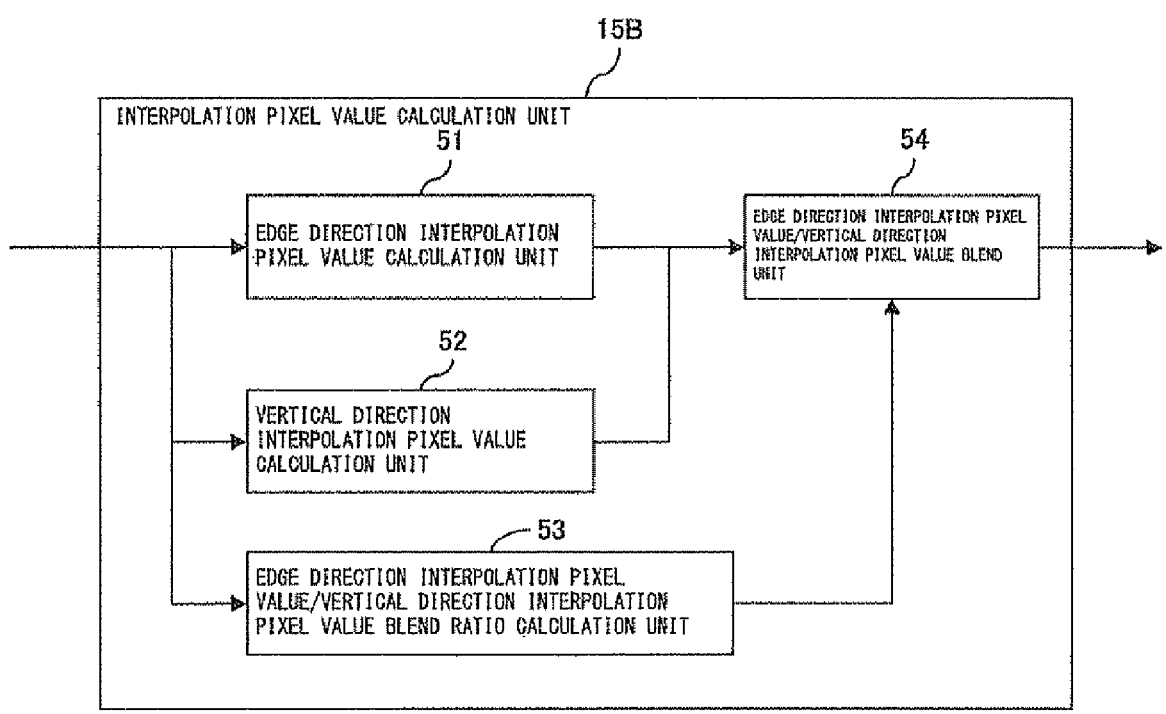
FIG. 22 shows another configuration of the interpolation pixel value calculation unit.

FIG. 22 shows another configuration of the interpolation pixel value calculation unit. The interpolation pixel value calculation unit 15B shown in FIG. 22 comprises an edge direction interpolation pixel value calculation unit 51, a vertical-direction interpolation pixel calculation unit 52, an edge direction interpolation pixel value/vertical-direction interpolation pixel value blend ratio calculation unit (hereinafter called blend ratio calculation unit) 53 and an edge direction interpolation pixel value/vertical-direction interpolation pixel value blend unit (hereinafter called blend unit) 54. In the description of FIG. 22 and after, "15B" is attached to this interpolation pixel value calculation unit in order to discriminate it from the interpolation pixel value calculation unit 15 shown in FIG. 20.

Since this edge direction interpolation pixel value calculation unit 51 is the same as that shown in FIG. 20, its description is omitted here.

The vertical-direction interpolation pixel calculation unit 52 calculates an interpolation pixel value on the basis of pixels positioned above/below the interpolation line in the vertical direction of the interpolation pixel. The blend ratio calculation unit 53 calculates a blend ratio between the interpolation pixel value (hereinafter called edge direction interpolation pixel value) calculated by the edge direction interpolation pixel value calculation unit 51 and the interpolation pixel value (hereinafter called vertical direction interpolation pixel value) calculated by the vertical direction interpolation pixel value calculation unit 52.

The blend unit 54 calculates a final interpolation pixel value on the basis of the edge direction interpolation pixel value and the vertical direction interpolation pixel value, using the blend ratio calculated by the blend ratio calculation unit 53 and outputs it.

FIG. 23 shows the calculation method of an interpolation pixel value in the interpolation pixel value calculation unit 15B shown in FIG. 22. In FIG. 23, as in FIG. 21, pixels on the existing line are shown in the top and bottom line, and pixels on the interpolation line are shown in the middle line.

The calculation method of the interpolation pixel value η in the edge direction of the interpolation pixel P is as already described with reference to FIG. 21.

The vertical direction interpolation pixel value γ of the interpolation pixel P can be calculated as follows using the pixel values A and B of pixels positioned in the vertical position of the interpolation pixel P, of pixels on the top and bottom existing lines shown in FIG. 23.

$$\gamma=(A+B)/2 \quad (2)$$

The calculation method of a vertical direction interpolation pixel value is not limited to the above-described and can also be calculated by the bi-cubic interpolation in the vertical direction.

The weight value ε of the edge direction interpolation and the weight value κ of the vertical direction interpolation pixel value used in the blend ratio between the edge direction pixel value η and the vertical interpolation pixel value γ are calculation as follows.

$$\epsilon=|A-B| \quad (3)$$

$$\kappa=|\alpha-\beta| \quad (4)$$

The final interpolation pixel value π of the interpolation pixel P can be calculated as follows, for example, using η, γ, ε and κ calculated by the above equations (1) to (4).

$$\pi=(\epsilon*\eta+\kappa*\gamma)/(\epsilon+\kappa) \quad (5)$$

In this case, it is assumed that if ε=κ=0, π=γ.

The calculation method of the weighting value ε of the edge direction interpolation pixel value is not limited to the above equation (3). For example, the average of the differential absolute values of pixels on lines above/below the interpolation pixel can also be calculated using not only pixels above/below the interpolation pixel but also several pixels (for example, seven pixels) in its horizontal direction around pixels above/below the interpolation pixel.

As described above, according to a pixel interpolation device according to this preferred embodiment, when continuous edges formed by continuous edge pixels are positioned on lines above/below (or to the left/right of) the interpolation line, these continuous edges can be detected as a continuous edge pair, an edge direction can be calculated on the basis of the detected continuous edge pair and an interpolation pixel value can be calculated. By calculating an edge direction on the basis of the combination of continuous edges actually detected as edges instead of calculating an edge direction in a prescribed range, as to even a gently inclined edge, an edge direction can be correctly determined. Furthermore, thus, jaggies can be reduced by correctly interpolating pixels.

What is claimed is:

1. A pixel interpolation apparatus for interpolating pixels, comprising:
    an edge pixel detection unit for detecting edge pixels forming an edge, from pixels on lines positioned above/below or to the left/right of an interpolation pixel;
    a continuous edge detection unit for detecting edge pixels in which two pixels or more consecutively line up among the edge pixels detected by the edge pixel detection unit as a continuous edge;
    a continuous edge pair detection unit for combining continuous edges detected from lines above and below the interpolation pixel or continuous edges detected from lines to the left and right of the interpolation pixel among the continuous edges detected by the continuous edge detection unit provided that a ratio in length between the continuous edges is equal to or less than a predetermined threshold;
    an edge direction determination unit for determining an edge direction of the interpolation pixel on the basis of a direction of connecting positions of corresponding pixels included in the continuous edges between one set of continuous edges included in a continuous edge pair specified by the continuous edge pair detection unit; and
    an interpolation pixel calculation unit for calculating an interpolation pixel using the edge direction determined by the edge direction determination unit;
    wherein the edge direction determination unit specifies a specified edge direction as a basic edge direction of the one set of continuous edge pixels and consecutively determines a final edge direction based on the basic edge direction and pixel correlation of peripheral pixels of the basic edge direction of an interpolation pixel.

2. The pixel interpolation apparatus according to claim 1, wherein the edge pixel detection unit calculates an edge intensity and an edge direction of a pixel and detects an edge pixel using the calculated edge intensity and edge direction.

3. The pixel interpolation apparatus according to claim 1, wherein the edge direction determination unit determines a direction obtained by connecting a middle point of each of the one set of continuous edges as an edge direction of the interpolation pixel.

4. The pixel interpolation apparatus according to claim 1, wherein when the connecting pixels are in the horizontal direction, the edge direction determination unit determines a direction obtained by connecting pixels at the left or right end of each of the one set of continuous edges as an edge direction of the interpolation pixel.

5. The pixel interpolation apparatus according to claim 1, wherein the edge direction determination unit determines an edge direction at a middle point of one continuous edge of the one set of continuous edges by the edge direction determination unit, as an initial value of the edge direction of an interpolation pixel, and consecutively determines an edge direction for each interpolation pixel from the middle point toward outside the continuous edge using pixel correlation of peripheral pixels of the initial value of the edge direction of an interpolation pixel.

6. The pixel interpolation apparatus according to claim 1, wherein the edge direction determination unit determines an edge direction at an end point of one continuous edge of the one set of continuous edges by the above edge direction determination unit, as an initial value of the edge direction of an interpolation pixel, and consecutively determines an edge direction for each interpolation pixel from the end point toward another endpoint using pixel correlation of peripheral pixels of the initial value of the edge direction of an interpolation pixel.

7. The pixel interpolation apparatus according to claim 1, wherein the interpolation pixel calculation unit calculates an interpolation pixel value using pixels in an edge direction determined by the edge direction determination unit.

8. The pixel interpolation apparatus according to claim 1, wherein when the connecting pixels are in the horizontal direction, the interpolation pixel calculation unit calculates an interpolation pixel value of an edge direction using pixels in the edge direction determined by the edge direction determination unit, and also calculates an interpolation pixel value of a vertical direction using pixels in the vertical direction of the one set of continuous edges, weights the interpolation pixel value in the edge direction and the interpolation pixel value in the vertical direction and outputs an interpolation pixel.

9. A method conducted by a pixel interpolation apparatus including a processor, the method, comprising:
- detecting, by the interpolation apparatus, edge pixels forming an edge, from pixels on lines positioned above/below or to the left/right of an interpolation pixel;
- detecting, by the interpolation apparatus, edge pixels in which two pixels or more consecutively line up among the detected edge pixels as a continuous edge provided that a ratio in length between the continuous edges is equal to or less than a predetermined threshold;
- determining, by the interpolation apparatus, a combination of continuous edges detected from lines above and below the interpolation pixel or continuous edges detected from lines to the left and right of the interpolation pixel among the detected continuous edges;
- determining, by the interpolation apparatus, an edge direction of the interpolation pixel on the basis of a direction of connecting positions of corresponding pixels included in the continuous edges between a specified one set of continuous edges included in a continuous edge pair; and
- calculating, by the interpolation apparatus, an interpolation pixel using the determined edge;
- wherein the determining of the edge direction specifies a specified edge direction as a basic edge direction of the one set of continuous edge pixels and consecutively determines a final edge direction based on the basic edge direction and pixel correlation of peripheral pixels of the basic edge direction of an interpolation pixel.

* * * * *